United States Patent
Orchard et al.

(10) Patent No.: US 9,964,959 B2
(45) Date of Patent: May 8, 2018

(54) METHOD AND APPARATUS FOR AIRCRAFT INSPECTION

(71) Applicant: AIRBUS OPERATIONS LIMITED, Bristol (GB)

(72) Inventors: Matthew Noel Orchard, Bristol (GB); Jonathan Dee, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days. days.

(21) Appl. No.: 15/148,036

(22) Filed: May 6, 2016

(65) Prior Publication Data
US 2016/0325854 A1 Nov. 10, 2016

(30) Foreign Application Priority Data

May 7, 2015 (GB) .................................. 1507839.7

(51) Int. Cl.
| | |
|---|---|
| B60L 9/00 | (2006.01) |
| G05D 1/04 | (2006.01) |
| B60L 11/18 | (2006.01) |
| B64D 37/00 | (2006.01) |
| B64F 5/60 | (2017.01) |
| G05D 1/10 | (2006.01) |

(52) U.S. Cl.
CPC ............ *G05D 1/048* (2013.01); *B60L 11/182* (2013.01); *B60L 11/1824* (2013.01); *B64D 37/005* (2013.01); *B64F 5/60* (2017.01); *G05D 1/102* (2013.01)

(58) Field of Classification Search
CPC .......... G05D 1/048; G05D 1/102; B64F 5/60; B60L 11/182; B60L 11/1824; B64D 37/005

USPC ......... 701/22, 29.3, 2, 4; 73/865.8; 700/255; 348/128
See application file for complete search history.

(56) References Cited

U.S. PATENT DOCUMENTS

| | | | |
|---|---|---|---|
| 2003/0030399 A1* | 2/2003 | Jacobs | G05D 1/0274 318/568.16 |
| 2003/0164952 A1* | 9/2003 | Deichmann | A61B 1/05 356/603 |
| 2006/0191909 A1* | 8/2006 | Powell | B29C 65/7841 219/633 |

(Continued)

FOREIGN PATENT DOCUMENTS

| | | |
|---|---|---|
| CN | 102060057 A | 5/2011 |
| CN | 102729240 A | 10/2012 |

(Continued)

OTHER PUBLICATIONS

Search Report dated Nov. 10, 2015 in Great Britain Application No. 1507839.7.
Krasny; "The Autonomous Maintenance Robot (AMR) for Confined Space Maintenance Applications"; www.navalengineers.org/ProceedingsDocs/FMMS/FMMS2012/FMMS12Papers/Krasny.pdf; Sep. 2012, Battelle Memorial Institute, Ohio.

(Continued)

*Primary Examiner* — Shardul D Patel
(74) *Attorney, Agent, or Firm* — Hauptman Ham, LLP

(57) ABSTRACT

The invention relates to a method and apparatus for inspecting an aircraft fuel tank. The invention also relates to an aircraft fuel tank including an inspection apparatus. The invention provides an aircraft fuel tank, the aircraft fuel tank containing a robotic device. The robotic device is arranged to be movable within the aircraft fuel tank. The robotic device further comprises a sensor for inspecting the aircraft fuel tank.

22 Claims, 2 Drawing Sheets

(56) References Cited

U.S. PATENT DOCUMENTS

| | | | | |
|---|---|---|---|---|
| 2008/0105067 | A1* | 5/2008 | Frey | G01B 11/24 73/865.8 |
| 2009/0108211 | A1* | 4/2009 | Bommer | G01N 22/02 250/395 |
| 2012/0215354 | A1* | 8/2012 | Krasny | B25J 9/1666 700/255 |
| 2013/0018525 | A1* | 1/2013 | Jang | G01N 29/225 701/2 |
| 2013/0261876 | A1* | 10/2013 | Froom | B64F 5/0045 701/29.3 |
| 2014/0210997 | A1* | 7/2014 | Blanchard | G01M 5/0016 348/128 |
| 2014/0360289 | A1* | 12/2014 | Georgeson | G01D 11/30 73/866.5 |
| 2015/0226369 | A1* | 8/2015 | Troy | F16M 11/18 180/2.1 |
| 2016/0375983 | A1* | 12/2016 | Yan | B64C 17/02 701/4 |

FOREIGN PATENT DOCUMENTS

| | | |
|---|---|---|
| KR | 1020140131080 A | 11/2014 |
| WO | 2009055218 A2 | 4/2009 |
| WO | 2011056633 A1 | 5/2011 |

OTHER PUBLICATIONS

Sattar et al.; "Amphibious NDT Robots", Climbing and Walking Robots: Towards New Applications; Oct. 2007; pp. 127-150, Itech Education and Publishing; Vienna, Austria.

Robotics Inspection System for Storage Tanks; Petroleum Success Story; Office of Industrial Technologies, US Department of Energy; Oct. 2000; Washington, DC.

Solex Introduces Maverick; www.solexrobotics.com/Solex7.html; dates between Oct. 12, 1999 and Mar. 22, 2016 (dates for web link obtained from Internet Archive https://archive.org/web/).

* cited by examiner

METHOD AND APPARATUS FOR AIRCRAFT INSPECTION

RELATED APPLICATIONS

The present application claims priority from Great Britain Application Number 1507839.7, filed May 7, 2015, the disclosure of which is hereby incorporated by reference herein in its entirety.

FIELD OF THE INVENTION

The present invention concerns the inspection of aircraft. More particularly, but not exclusively, this invention concerns the inspection of aircraft to investigate whether any structural damage is present. The invention also concerns the automatic inspection of aircraft by robotic devices.

BACKGROUND OF THE INVENTION

Aircraft require regular inspection in order to ensure that stresses and strains experienced during operation of the aircraft have not caused structural damage to the aircraft, for example cracks. Aircraft inspection is time consuming as it usually involves an engineer making a visual inspection of the aircraft, often in accordance with a manufacturer determined schedule. This may increase the downtime of an aircraft, thus making operation more expensive for an airline. Additionally, some elements of an aircraft are difficult to inspect visually, for example the inside of a wing structure, such as a fuel tank, and particularly the inside of a fuel tank. The inspection process of such elements will take longer than for external, easily viewed, elements of the aircraft, and may further increase the aircraft downtime.

To address this problem, aircraft designers may factor in significant additional strength in to those elements of the aircraft, thereby providing a redundancy to increase safety and reduce the risk of structural damage going unnoticed. This "overdesigning" of aircraft elements may increase the weight of the aircraft, making it less efficient to operate, and also increase the cost of manufacture.

The present invention seeks to mitigate the above-mentioned problems. Alternatively or additionally, the present invention seeks to provide an improved apparatus and method for inspecting aircraft.

SUMMARY OF THE INVENTION

The present invention provides, according to a first aspect, an aircraft fuel tank, the aircraft fuel tank containing a robotic device, the robotic device arranged to be movable within the aircraft fuel tank, the robotic device further comprising a sensor for inspecting the aircraft fuel tank.

The aircraft fuel tank according to the invention may be able to be constructed of lighter weight or thinner material than existing fuel tanks as more regular inspections of an aircraft fuel tank may reduce the need for structural redundancies in a design. The invention allows regular inspection of the fuel tank allowing any potential defects in the fuel tank to be detected in good time before they become a structural problem. Minor defects may be easily located and fixed. This may increase the lifespan of the aircraft fuel tank. Additionally the lifespan may be increased due to the potential for increasing the flight time of an aircraft fuel tank or fuel tank component prior to replacement, as redundancy in replacement and/or maintenance programs may be reduced. The invention may allow an aircraft fuel tank to be inspected without requiring the fuel to be drained from the tank prior to inspection. This may save a significant amount of fuel which might otherwise be wasted, and also decrease the time taken for an inspection. Reducing the ground time of an aircraft may improve the operating efficiency of the aircraft for an airline. The invention may result in fewer constraints on the inspection process as areas of particular concern can be easily inspected.

The robotic device may be permanently contained within the aircraft fuel tank. The robotic device may comprise a propulsion device arranged to move the robotic device around the aircraft fuel tank. The propulsion device may comprise movable legs or wheels. The movable legs or wheels may be configured to allow the robotic device to "walk" or be driven around the aircraft fuel tank. The propulsion device may comprise a propeller or jet nozzle. The propeller or jet nozzle may allow the robotic device to be driven around the aircraft fuel tank whilst floating or being suspended in fuel present in the aircraft fuel tank. The robotic device may comprise a buoyancy tank. The buoyancy tank may allow the buoyancy of the robotic device to be increased or decreased, thus facilitating the movement of the robotic device around the aircraft fuel tank. The movement of the robotic device allows use of the sensor for inspection of a wall, or surface, or structural component within the aircraft fuel tank.

The aircraft fuel tank may further comprise a docking station for the robotic device. The docking station may be arranged to secure the robotic device in a fixed position. The robotic device may be docked in the docking station during operation of the aircraft, thereby securing the robotic device during flight and preventing the robotic device from damaging the aircraft fuel tank. The robotic device may be released from the docking station when the aircraft is on the ground and stationary, thus allowing the robotic device to inspect the aircraft fuel tank.

Other than when the robotic device is docked in the docking station, the robotic device may be configured for free and unencumbered movement around the aircraft fuel tank. Such a robotic device may have no tethering within the aircraft fuel tank during operation.

The aircraft fuel tank may further comprise a charging station for the robotic device. The charging station may be arranged to charge the robotic device to enable the operation of the robotic device without requiring any in-tank electrical wiring. The charging station may be arranged to charge the robotic device by inductive charging. The charging station may be associated with or part of the docking station.

The sensor may be an ultrasound sensor. The sensor may be an eddy current sensor. The sensor may be an optical or infra-red camera. The sensor may be arranged to detect cracks or flaws in a surface, wall, or structural component of the aircraft fuel tank. The robotic device may comprise a plurality of sensors, and the sensors may be different types of sensor.

The robotic device may comprise a location system. The location system may be arranged to record and/or transmit the location of the robotic device within the aircraft fuel tank. The location system may comprise a GPS device. The results of the inspection of the aircraft fuel tank may include the location of the robotic device during the inspection. Such an arrangement allows for any faults detected by the inspection to be located within the aircraft fuel tank.

The aircraft fuel tank may comprise a wireless communication device. The wireless communication device may transmit the inspection results to a wireless receiving device external to the aircraft fuel tank. The wireless receiving device may, for example, be a smart communication device, such as a smart phone or computer tablet. The wireless communication device may be part of the robotic device. Alternatively, the wireless communication device may be part of the docking station. The wireless communications protocol may be Bluetooth® or other suitable protocol. The robotic device may be arranged to store the inspection results and pass them onto the docking station once an inspection procedure has been completed. The docking station may then transmit the results to a wireless receiving device. In an alternative arrangement, the docking station may comprise a wired communication device through which the inspection results may be transmitted. The wired communication device may comprise an external communications port to which an external communications device may be connected. The external communications device may be connected to the external communications port once the inspection procedure has been completed, and the robotic device has returned to the docking station.

According to a second aspect of the invention, there is provided a method of inspecting an aircraft fuel tank for structural defects, the method comprising the steps of:

activating a robotic device within the aircraft fuel tank, the robotic device including a sensor for the non-destructive testing of the aircraft fuel tank, the robotic device moving around the aircraft fuel tank, and during the movement of the robotic device around the aircraft fuel tank, collecting inspection data from the sensor of the robotic device.

The robotic device may comprise a drive and power unit for moving the robotic device around the aircraft fuel tank. The drive and power unit may be located fully within the aircraft fuel tank, thus requiring no external drive and power unit to facilitate movement of the robotic device.

The method may include the step of storing the inspection data collected from the sensor of the robotic device in a memory unit associated with the robotic device. The method may include the step of transmitting the stored data from a memory unit associated with the robotic device to a data receiving unit not associated with the robotic device. Such a data receiving unit may be a smart phone or tablet device. The method may comprise the step of securing the robotic device to a docking station once the inspection is complete. The robotic device may be secured to the docking station to provide a flight-safe mode. The method may comprise the step of charging the robotic device via an inductive charging system. Advantageously, charging the robotic device via an inductive charging system may avoid the need for electrical wiring within the aircraft fuel tank for charging purposes.

According to a third aspect of the invention, there is provided an aircraft, the aircraft comprising an aircraft fuel tank according to the first aspect of the invention. The aircraft fuel tank according to the first aspect of the invention is arranged to supply fuel to the engines of the aircraft.

According to a fourth aspect of the invention, there is provided a method of inspecting an aircraft using a robotic device, comprising the steps of:

activating the robotic device, the robotic device comprising a sensor configured to obtain inspection data relating to the aircraft, the robotic device moving around the aircraft, and during movement of the robotic device around the aircraft, collecting inspection data from the sensor of the robotic device.

The robotic device may be permanently associated with the aircraft. Alternatively, the robotic device may be temporarily associated with the aircraft. The temporary association may be only during the inspection of the aircraft. The robotic device may be associated with a number of different aircraft and inspect each aircraft respectively. Being able to inspect a number of different aircraft using the same robotic device may provide a more economical inspection solution to an aircraft operator. The robotic device may be configured to inspect different aircraft. Such configuration may comprise data regarding the dimensions of each aircraft.

According to a fifth aspect of the invention, there is provided an aircraft inspection apparatus comprising:

a robotic device, the robotic device comprising a drive and power unit for facilitating the movement of the robotic device relative to an aircraft under inspection, and a sensor unit, the sensor unit arranged to inspect an aircraft under inspection for structural defects.

The aircraft inspection apparatus may be arranged to be associated with a stationary aircraft, for example in an aircraft hangar. The aircraft inspection apparatus may be arranged to take sensor readings of parameters relating to a aircraft with which it is associated. For example, the aircraft inspection apparatus may be associated with a wing of an aircraft. The aircraft inspection apparatus may be driven along the external surface of the wing by the drive and power unit. As the aircraft inspection apparatus may be driven along the aircraft wing, the sensor unit may inspect the wing for structural defects. The sensor unit may be an eddy current sensor, or an ultrasound sensor.

The provision of an aircraft inspection apparatus as set out above may improve the efficiency of an aircraft inspection process. Efficiency improvements may include an improved accuracy of inspection, an improved thoroughness of inspection, and/or an improved speed of inspection. The aircraft inspection apparatus may conveniently be used on an aircraft during aircraft downtime.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
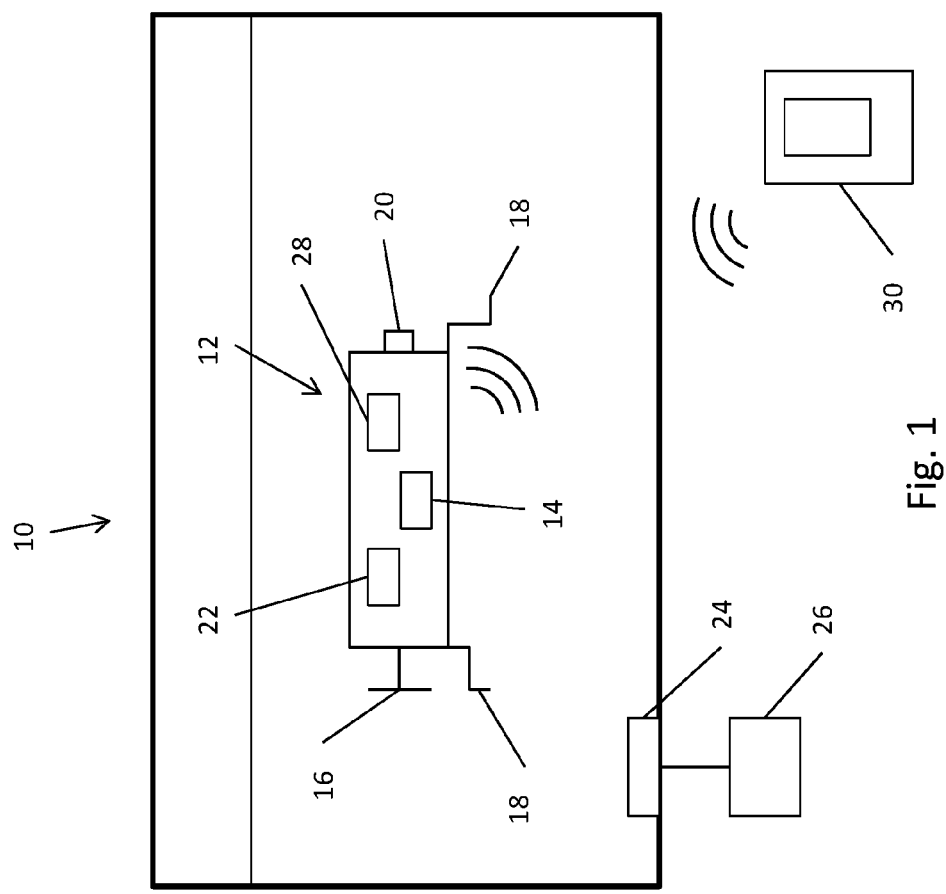
FIG. 1 shows a schematic view of an aircraft fuel tank according to a first embodiment of the invention.

FIG. 1 shows an aircraft fuel tank 10 containing a robotic device 12. The robotic device 12 includes a buoyancy tank 14, a propeller 16, and a plurality of legs 18. In an alternative embodiment, the legs 18 could be replaced with tracks. The robotic device further comprises a sensor 20 and a GPS location device 22. The sensor 20 is an eddy current sensor, but could in alternative embodiments be an ultrasound sensor or any other sensor suitable for non-destructive testing. The fuel tank 10 includes a docking station 24 including an inductive charging station connected to a power source 26 outside the fuel tank 10. The robotic device 12 may be clamped to the docking station 24 by the plurality of legs 18. Once clamped to the docking station 24 the robotic device 12 may be charged by inductive charging. When clamped to the docking station 24, the robotic device 12 is also in a flight safe mode, so the aircraft including the aircraft fuel tank may take off, fly, and land, without the robotic device 12 being at risk of damaging the aircraft fuel tank 10. The robotic device 10 includes a wireless communications chip 28 for wirelessly communicating, for example via Bluetooth®, with a computer device, for example a tablet computer 30, outside the aircraft fuel tank 10.

The apparatus shown in FIG. 1 may operate as follows in order to inspect the aircraft. Whilst the aircraft of which the fuel tank 10 is a part is moving, whether that be taxiing movement on the ground or during flight, the robotic device 12 is clamped securely to the docking station 24. During docking, the robotic device 12 may be inductively charged by the power source 26. When the aircraft is stationary, for example during a night stop-over, the robotic device 12 may be activated. The activation may be as a result of a signal sent by the aircraft control system, or by a control device such as the tablet computer 30 located outside the aircraft. In an alternative embodiment, the robotic device may be activated when the robotic device has detected it has been stationary for a set period of time, indicating a stop-over. When activated, the robotic device 12 unclamps from the docking station 24 and begins moving around the inside of the fuel tank 10. The movement within the fuel tank 10 may be due to movement of the plurality of legs 18 "walking" the robotic device 12 around within the fuel tank. Alternatively, the movement within the fuel tank 10 may be due to use of the buoyancy tanks 14 making the robotic device 12 buoyant enough to be driven around the fuel tank by the propeller 16 provided there is a suitable volume of fuel within the fuel tank. The robotic device may comprise a plurality of propellers to provide directional control or alternatively or additionally a rudder (not shown). As the robotic device 12 moves around the fuel tank 10, the sensor 20 takes readings to detect whether there are any structural defects in the aircraft fuel tank 10. For example, the sensor 20 may take eddy current readings in proximity to the inner walls of the aircraft fuel tank 10. Such readings are likely to vary in the presence of a structural defect such as a crack in the wall, thereby indicating the presence of the defect. The readings taken by the sensor 20 may be analysed and/or stored by the robotic device 12. The sensor readings are recorded with the location of the robotic device 12 provided by the GPS unit 22 in order to provide an indication of the location of the structural defect. The location of the robotic device may be provided in relation to a fixed point within the fuel tank 10 in order to allow easy location of the structural defect, whether for further investigation or taking remedial action. The fixed location may be the docking station 24. The robotic device 12 may transmit the sensor readings and GPS readings taken during movement within the fuel tank 12 and transmit them to the tablet computer 30. The tablet computer 30 may analyse the results and indicate to an engineer whether any remedial action needs to be taken. The tablet computer 30 may store the results or send the results on to a central storage facility. The results of each inspection of an aircraft fuel tank may be stored in order to provide a lifetime of inspection results. Such information may be useful to determine any common failures in a particular type of fuel tank. Such information may also be useful to improve the design of a fuel tank.

The movement of the robotic device 12 within the fuel tank 10 may be in accordance with a pre-set movement pattern. Such a movement pattern may be programmed into the robotic device prior to installation within a fuel tank. The movement pattern may be specific to the design of the fuel tank within which the robotic device 12 moves. This allows the same robotic device 12 to be installed in a number of different fuel tanks, with only a change in the programming of the robotic device 12 required. Several movement patterns may be programmed into the robotic device 12, with one pattern chosen when installing the robotic device within a fuel tank, the pattern chosen to correspond to the appropriate fuel tank.

Once the inspection process is complete, the robotic device 12 is moved back to the docking station 24 and clamped securely into position. The aircraft may now taxi, take off, and land, as normal, with the robotic device 12 presenting no risk of damage to the aircraft. Once the aircraft is stationary again, the inspection process may begin again. The method and apparatus as described provides a straightforward and reliable way of inspecting an aircraft fuel tank after each flight. Performing such regular inspections may reduce the maintenance burden of an aircraft, as any potential structural defects are detected very soon after they occur. The inspection process may also be advantageous over visual inspections by an engineer, potentially being more reliable, and more consistent than a visual inspection. The inspection process may pick up structural defects that are not visible to the human eye. The inspection process may allow inspection of areas not easily viewable by an engineer.

Figure 2:
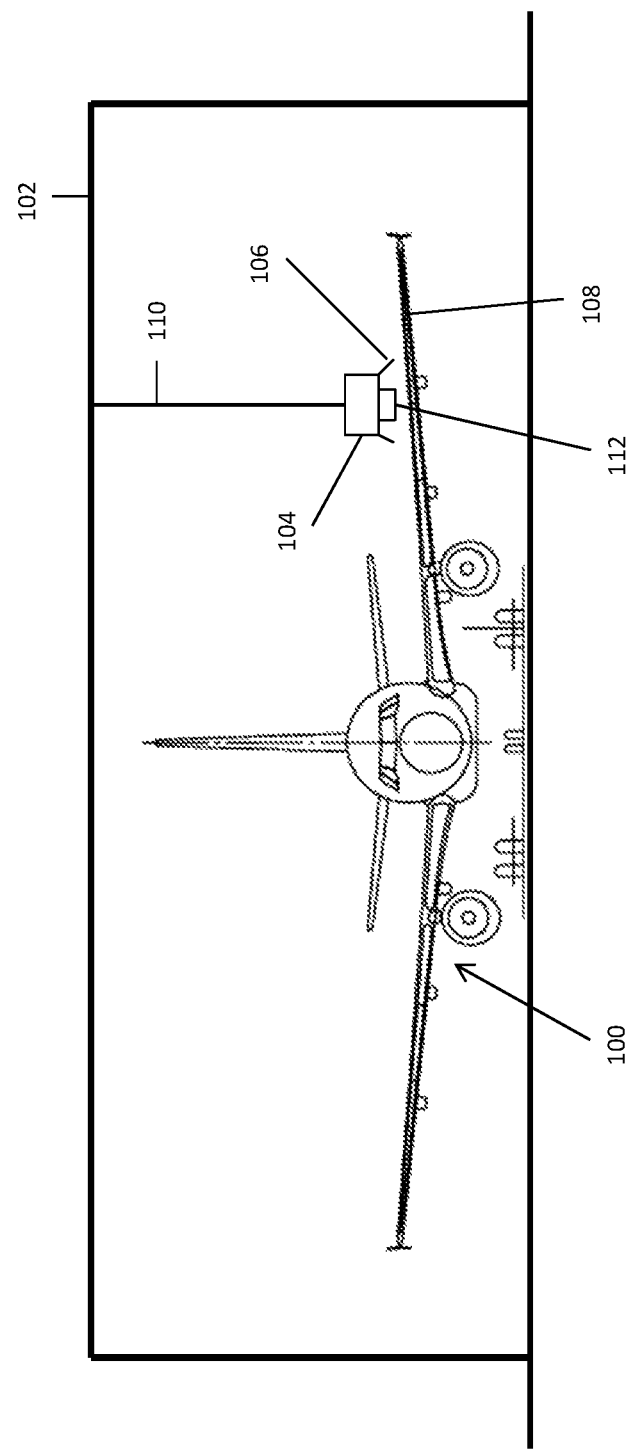
FIG. 2 shows a schematic view of an aircraft and inspection apparatus according to a second embodiment of the invention.

FIG. 2 shows a second embodiment of the invention. An aircraft 100 may be stationary within a frame 102. The frame 102 may be within an aircraft hanger. A robotic device 104 is provided including a plurality of legs 106 which enable the robotic device to move along a wing 108 of the aircraft 100. The robotic device 104 may be attached to an umbilical cord 110, which may lift the robotic device 104 away from the wing 108 or place the robotic device 104 on the wing 108, and also provides power to the robotic device 104 via a charging lead. The robotic device 104 includes a sensor 112, in this case an ultrasound sensor. The robotic device 106 may inspect the aircraft wing 108 for structural defects as follows.

The aircraft may be located underneath the frame 102. The umbilical device 110 may position the robotic device 104 onto the aircraft wing 108 and then release the robotic device 104 for free movement around the wing 108. Once the robotic device is free to move, it starts to move around the wing 108 in a pre-programmed manner, using the ultrasound sensor 112 to inspect the wing 108 for structural defects. The robotic device 104 includes a location device, for example a GPS chip, which is used to record the location of any structural defects detected by the ultrasound sensor. Once the inspection process is complete, the robotic device 104 may be reconnected to the umbilical cord 110 and removed from the aircraft wing 108. Once the robotic device 104 has been removed from the aircraft wing 108 the aircraft 100 may taxi, take off, and land as usual.

The robotic device 104 may store and/or transmit data concerning the inspection process as described for the first embodiment of the invention.

Unlike the first embodiment of the invention, the robotic device may be used to inspect a plurality of different aircraft. The apparatus according to the second embodiment of the invention may allow a single inspection station to be used to inspect a large number of aircraft. The details of the aircraft inspected and the results of the inspections may be stored at a central storage facility.

The aircraft 100 may also include a fuel tank 10 as described with regards to FIG. 1 of the application.

Whilst the second embodiment of the invention has been described in relation to the inspection of an aircraft wing, the robotic device 104 could be used to inspect other parts of an aircraft, for example the fuselage, for structural defects. In alternative embodiments, the robotic device 104 could be used to inspect internal parts of the aircraft, for example a wing structure, for structural defects. In such embodiments it is necessary to locate and remove the robotic device within the aircraft wing as appropriate.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft fuel tank, the aircraft fuel tank containing a robotic device, the robotic device arranged to be movable within the aircraft fuel tank, the robotic device further comprising a sensor for inspecting the aircraft fuel tank, wherein the robotic device is permanently contained within the aircraft fuel tank, and wherein the robotic device is configured for free and unencumbered movement around the aircraft fuel tank.

2. The aircraft fuel tank according to claim 1, wherein the robotic device comprises a propulsion device arranged to move the robotic device around the aircraft fuel tank.

3. The aircraft fuel tank according to claim 1, further comprising a docking station for the robotic device.

4. The aircraft fuel tank of claim 3, wherein the robotic device is securely clamped to the docking station in a flight safe mode.

5. The aircraft fuel tank according to claim 1 further comprising a charging station for the robotic device.

6. The aircraft fuel tank according to claim 5, wherein the charging station is arranged to charge the robotic device by inductive charging.

7. The aircraft fuel tank according to claim 6, further comprising a docking station for the robotic device, and wherein the charging station being associated with or being part of the docking station.

8. The aircraft fuel tank according to claim 5, further comprising a docking station for the robotic device, and wherein the charging station being associated with or being part of the docking station.

9. The aircraft fuel tank according to claim 1, wherein the sensor is arranged for non-destructive testing of the aircraft fuel tank.

10. The aircraft fuel tank according to claim 1, wherein the sensor is an ultrasound sensor.

11. The aircraft fuel tank according to claim 1, wherein the sensor is an eddy current sensor.

12. The aircraft fuel tank according to claim 1, wherein the sensor is an optical or infra-red camera.

13. The aircraft fuel tank according to claim 1, wherein the robotic device comprises a location system.

14. The aircraft fuel tank according to claim 1 further comprising a wireless communication device.

15. The aircraft fuel tank according to claim 1, further comprising a wired communication device through which the inspection results may be transmitted.

16. The aircraft, the aircraft comprising an aircraft fuel tank according to claim 1.

17. The aircraft fuel tank of claim 1, wherein the robotic device is movable when the aircraft is stationary.

18. A method of inspecting an aircraft fuel tank for structural defects, the method comprising the steps of:
    activating a robotic device within the aircraft fuel tank, the robotic device including a sensor for the non-destructive testing of the aircraft fuel tank,
    the robotic device activating the sensor,
    the robotic device moving around the aircraft fuel tank, and
    during the movement of the robotic device around the aircraft fuel tank, collecting inspection data from the sensor of the robotic device.

19. The method according to claim 18, wherein the robotic device comprises a drive and power unit for moving the robotic device around the aircraft fuel tank.

20. The method according to claim 19, wherein the drive and power unit is located fully within the aircraft fuel tank, thus requiring no external drive and power unit to facilitate movement of the robotic device.

21. The method according to claim 18, further comprising the step of securing the robotic device to a docking station once the inspection is complete.

22. The method according to claim 18, further comprising the step of charging the robotic device via an inductive charging system.

* * * * *